Feb. 11, 1969     H. H. KERR III, ET AL     3,426,452

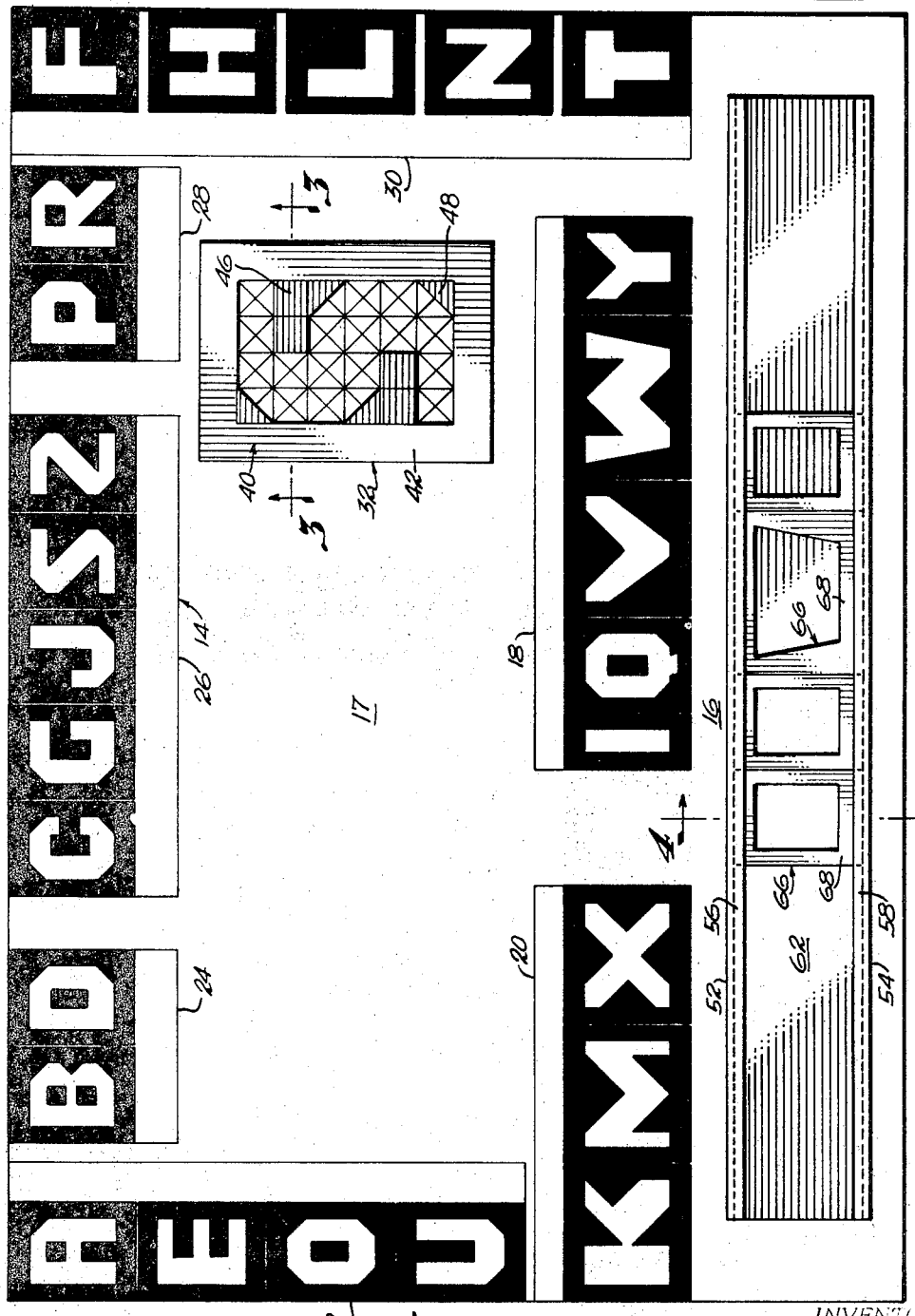

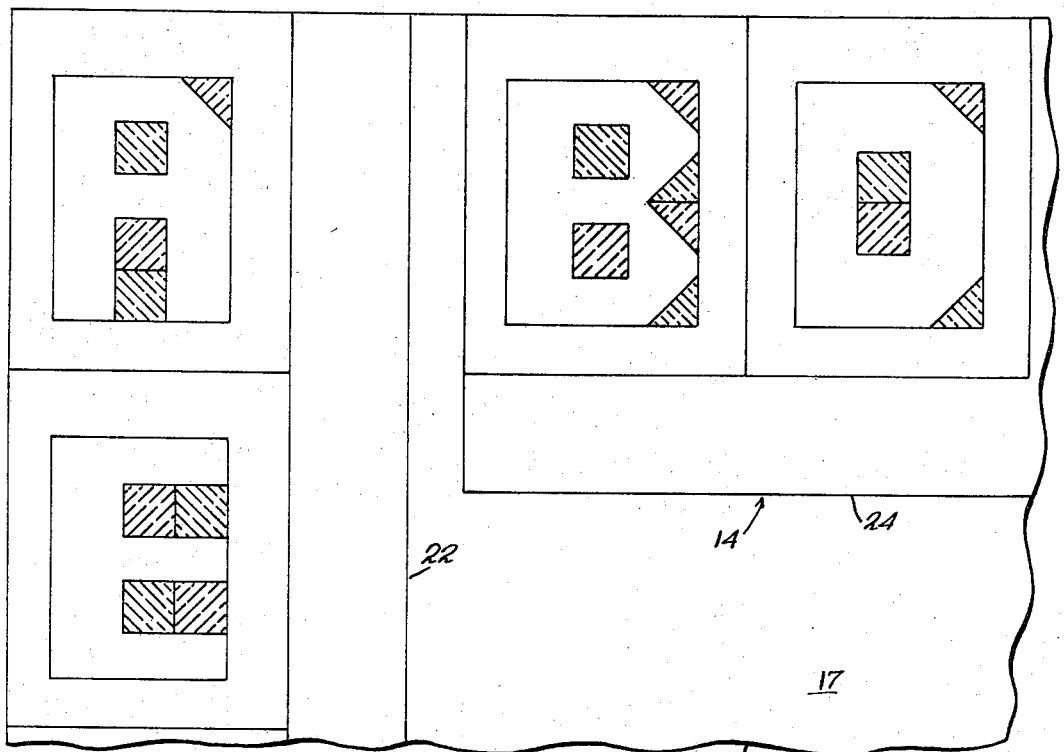

EDUCATIONAL TOY

Filed Aug. 25, 1966     Sheet 3 of 3

INVENTORS.
HUGH H. KERR III
CHARLES DEMEE
BY John Cyril Malloy
ATTORNEY.

U.S. Cl. 35—35
Int. Cl. G09b *17/00, 1/24*

United States Patent Office 3,426,452
Patented Feb. 11, 1969

3,426,452
EDUCATIONAL TOY
Hugh H. Kerr III, 2921½ Bird Ave., Miami, Fla.
33133, and Charles Demee, 107 NE. 22nd St.,
Miami, Fla. 33137
Filed Aug. 25, 1966, Ser. No. 575,103
7 Claims

ABSTRACT OF THE DISCLOSURE

A game board and frame members used in an educational device in which said frame members define a closed, recessed area on a base and in which the area peripherally defines limits of a figure to be produced at the option of a user, and in which a plurality of game members are removably but adheringly applicable in said area and have a regular polygonal shape including a side marginal edge which is a multiple of a unit length whereby a plurality of the game members are combined to form a completed figure at the option of the user.

---

This invention relates to an educational toy and, more particularly, to an educational toy especially adapted for use in playing word games for the purpose of increasing the vocabulary of a player or of teaching the letter construction of words.

It is, accordingly, an object of this invention to provide a novel structure which includes a game surface and members movable on the game surface within the frame into predetermined positions whereby indicia comprising letters will be formed and which letters may be arranged in relation to one another so as to construct words.

It is another object of this invention to provide an educational toy or game which includes a gaming board and a frame with members movable within the frame to define letters by positioning the members in predetermined locations relative to the frame.

It is another object of this invention to provide an educational toy or game which is adapted to be utilized in teaching spelling, word construction and increasing vocabulary and which is inexpensive to manufacture, adapted for distribution as a game, and is simple in structure and otherwise well adapted for the purposes for which it is intended.

In accordance with these and other objects which will become apparent hereinafter, the instant invention will now be described with reference to the accompanying drawings.

In the drawings:

FIGURE 1 is a plan view of an embodiment of an educational toy;

FIGURE 2 is a partial plan view of the upper left-hand corner portion of FIGURE 1 which has been enlarged for illustrative purposes;

FIGURE 3 is a view in cross section taken along the plane indicated by the line 3—3 of FIGURE 1 and looking in the direction of the arrows;

FIGURE 4 is a view in cross section taken along the plane indicated by the line 4—4 of FIGURE 1 and looking in the direction of the arrows;

FIGURE 5 is a composite view illustrating the movable members of the educational toy as seen in plan;

FIGURE 6 is a view in cross section of the respective figures of the composite view of FIGURE 5 and illustrating the construction thereof;

Figures 7, 8, 9:
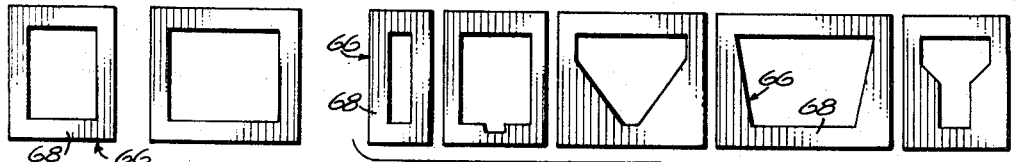
FIGURE 7 is a plan view illustrating the outline of the frame of the educational toy, which frame is for the letters of a principal group of letter characters.
FIGURE 8 is a plan view illustrating the outline of the frame of the educational toy, which frame is for the letters of a secondary group of letter characters.
FIGURE 9 is a composite plan view illustrating the outline of the frames of the educational toy, which frames are for a special group of letter characters.

Referring more particularly to the drawings, wherein like reference characters designate like or corresponding pats throughout the different views, and referring particularly to FIGURE 1, the numeral 12 generally designates a game board which includes an upper zone 14 and a lower zone 16, with the lower zone 16 occupying substantially the lower one-fourth of the area across the game board. A grouping of letter characters is provided in boundary relation to the upper portion 14 circumposed about a central zone 17. The grouping is composed of a special group of letter characters 18, the secondary group of letter characters 20 and the principal or main group across the top and the left and right-hand side, which principal group is broken into several classes, a first class designated by the numeral 22 which comprises the vowels A, E, O and U, a second class designated by the numeral 24 which comprises the letters B and D, a third class designated by the numeral 26 which comprises the letter characters C, G, J, S and Z, a fourth class designated by the numeral 28 which comprises the letters P and R, and a fifth class designated by the numeral 30 which comprises the letters F, H, L, N and T. The significance of the subdivision of the principal group into the five classes will be discussed in more detail hereinafter.

Within the central zone 17 a practice board 32 may be provided and which will now be described on reference to FIGURE 3 in which it is shown in cross section. It is seen that a base 34 which is rectangular as seen in plan is provided and which overlays the main surface of the game board. The base is covered by a metal plate 36 on which there are scribed various markings of squares in rows and columns, each of which square is subdivided into four equilateral triangles as can be seen in FIGURE 1. The indicia may be provided on a sheet of paper indicated by the numeral 38 or scribed in the metal plate.

A boundary frame 40 is provided to overlay the margins of the practice board, it being noted that the boundary frame is composed of a main body portion 42 with the face thereof which confronts the base being provided with a magnetic impregnated rubberized coating 44. A plurality of members 46, 46′, 46″ and 48, 48′ in the form of either squares or triangles respectively as seen in plan are provided and sized to register with the square or triangles respectively of the indicia surface 38. Members 46, 46′, 46″ and members 48, 48′ have a base 44 similar to and having the properties of that previously described. With reference to the practice board 32 it is seen that the arrangement of the members within the boundary may be such as to create various letters which correspond in configuration to the letters of the various groups arranged around the upper portion 14 of the game board 12. As can be seen upon reference to FIGURE 2, the arrangement of the square and triangular-shaped members may be such as to create various other letters. Indeed, each of the groups disposed about the upper portion includes instructions with respect to the formulation of the particular letter characters. For instance, the first class of the principal group composed of the vowels A, E, O and U is illustrated in the left-hand side of FIGURE 2 and it is seen that the arrangement of the squares and triangles may be employed to cause the space remaining within the boundary frame to appear as the letter.

Figure 10:
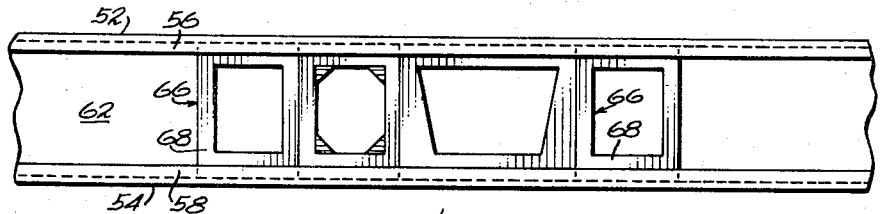
FIGURES 10, 11 and 12 are figures arranged in sequence and illustrating the plan of the game as it is described more fully hereinafter.
Figure 11:
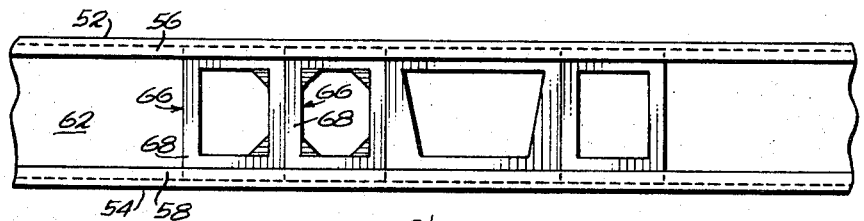
Figure 12:
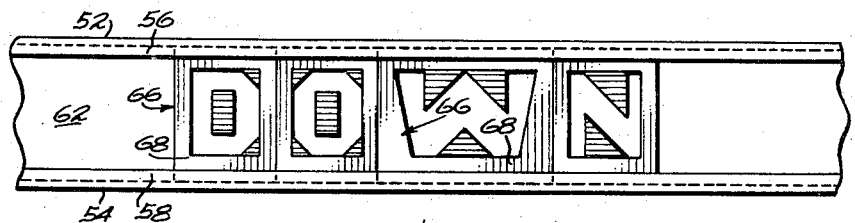

Turning now to the lower portion 16 of FIGURE 1, which may be seen in a further detail on reference to FIGURE 4 illustrating the same in cross section, it is seen that a first and a second spaced elongate guide rail 52 and 54 are provided, each of which includes a lip to confront the opposing rail 56 and 58 which are provided in parallel relation and define the boundaries of a game playing area. The guide rails are adapted to hold game playing members on a longitudinally-extending base or web 60 which rests on the game board 12 and which is covered by a metal face cover 62 and which slidably accommodates boundary frames such as 66 which are composed of the body 68 and a magnetically impregnated base 70 so as to cling to the metal cover and render the requirement of the flange or lips 56 and 58 unnecessary, albeit desirable. A game may be played by using this structure with the players selecting the boundary frames which are characteristic of the letters forming a word and which boundary frames are selected from an appropriate group as determined from the upper portion of the game board. For instance, with reference to FIGURES 10, 11 and 12, a game may be played by two players, one of whom selects a word, for instance, the word "down." The player selecting that word would pick the boundary frames which are the same size as the appropriate group in which the constituent letter characters appear. For instance, three of the letters are in the principal group described above and one of the letters is in the special group described above. That player would then position the boundary frames in the correct sequence in the channel or game board of the lower portion whereupon the definition of the word would be given to the opponent who would then have the burden of stating what the word is. If he did not know, he would then call for a clue. The first clue to be called for is the vowel clue. The player determining the word is first told which frames contain vowels by giving numerically their position in the sequence of letters. For example, in FIGURE 10 the second frame contains the only vowel. Second, the opposing player positions triangular members in the corners of the frames to which they apply. The player guessing the word may then arrive at the identity of the vowels by referring to the instructions pertaining to the first class of the principal group. In the instant case the positioning of triangles in all four corners as in FIGURE 10 indicates that the second letter is an O. Should the opposing player still not know the identity of the word, the consonant clue would then be given. This clue consists of positioning the triangular members in the corners of the consonant frames where required. By the locations of the triangular members and by the appearance of the special frames the opposing player may determine the identity of the consonants. For instance, the placing of triangles in the upper and lower right corners of the first frame in FIGURE 11 indicates that that letter belongs to the second group and is therefore either a B or a D. A point scoring system would be recorded which would ultimately determine the winner of the game. It will be seen that upon playing of the game one will become familiar with the fact that the various groups have special characteristics. For instance, the special group composed of the letters I, Q, V, W and Y is identifiable readily by reason of the fact that the boundary frame reveals the particular letter. For instance, it is seen upon reference to FIGURE 10 that immediately upon the selection of the boundary frame for the W it can be determined that that letter is, in fact, a W. With respect to the others of the group there is an odd shape character about them which permits of the deduction as to the letter character which is represented by them. Likewise, with respect to the secondary group composed of the letters K, M and X, the width of the frame indicates it must be one of those three but does not indicate which of the three it is. For this reason there is a deduction process which must be engaged in by the player in order to determine which particular letter character of the special group is concerned in the particular word being constructed.

With respect to the first class of the principal group, which is the vowel group composed of the letters A, E, O and U, a vowel clue is given as the first clue of the game and will consist of, for instance, the positioning of a triangle in the upper right-hand corner in the even that one wishes to designate the clue for the letter A or of the positioning in the four corners of triangles if one wants to indicate the letter O, and by the positioning in the two lower corners only in the case of the U. The letter E is indicated by the absence of triangles in a frame stated in the vowel clue to contain a vowel. In a similar fashion, the second class of the principal group composed of the letters B and D may be indicated by the consonant clue which indicates it has to be one of these two letters and each have the characteristic of triangles inserted in the upper and lower right-hand corners of the frame and are the only ones which have it at both the upper and lower right-hand corners. In similar fashion, the third class of the principal group which is composed of the letters C, G, J, S and Z, are identifiable by a consonant clue which takes into consideration the fact that the C requires a triangle to be inserted in all four corners, the G requires the insertion of triangles in the upper and lower left corners of the boundary frame, the J requires the insertion of triangles in the lower left and right corners of the frame, the S requires the insertion of triangles in the diametrically opposed upper left and lower right corners, and this is just the opposite of the diagonal positioning of the triangles for the letter Z. With respect to the fourth class of the principal group which is composed of the letters P and R, the consonant clue indicates one of these two letters when triangles are inserted in the upper right corners only. The fifth class composed of the letters F, H, L, N and T of the principal group is the class which ordinarily gives the most difficulty in playing the game since the characteristic positioning of the triangles or the characteristic size of the boundary frame does not give a clue and requires that a player judge the probability sequence of the letters in order to determine which of these is the correct consonant to complete a word.

It will thus be seen that while there has been shown a preferred embodiment and utilization of the structure of the particular educational toy disclosed herein, other games and word patterns and letter arrangements may be made for the purpose of teaching and this invention is, therefore, not to be confined to the particular game or utilization disclosed herein. For instance, the game may be utilized and adopted for use in newspapers and as a system for teaching words in vocabulary in schools or as a part of an entertainment television performance. While the instant invention has been shown and described herein in what is conceived to be the most practical and preferred embodiment and utilization of the structure of may be made therefrom within the scope of the invention, which is therefore not to be limited to the details disclosed herein but is to be accorded the full scope of the claims so as to embrace any and all equivalent apparatus and articles.

What is claimed is:
1. In an educational device, a base including a frame peripherally defining an upwardly-opening, polygonal recessed area, said area defining the outer limits of a polygonal figure; and a plurality of polygonal, game members optionally positionable in said area, said base and game members including cooperating, retaining means for adheringly and removably retaining said game members in said area, certain of said game members having a triangular shape and others of said game members having a rectangular shape, the side margins of said game members being a multiple of a unit length and positionable relative to each other and with respect to said outer limits of said area for combining to form a completed polygonal figure at the option of a user.

2. The structure as claimed in claim 1 in which said area includes indicia means thereon conforming to at least a uniform portion of the area defined by the shape of said game members.

3. The structure as claimed in claim 1 in which said cooperating, retaining means comprises magnetically-attractive materials.

4. The structure as claimed in claim 1 in which said completed figure comprises a letter of an alphabet.

5. The structure as claimed in claim 1 including in combination a game board, said game board including means defining at least one polygonal figure corresponding to the polygonal figure optionally produced within said recessed area.

6. The combination as defined in claim 5 in which said game board includes retaining means for adheringly and removably retaining said game members on said game board in said polygonal figure configuration.

7. The combination as claimed in claim 5 in which said polygonal figure is a letter of an alphabet.

References Cited

UNITED STATES PATENTS

| | | | |
|---|---|---|---|
| 1,410,194 | 3/1922 | Kolk | 40—28 XR |
| 1,475,112 | 11/1923 | Grimes et al. | 35—27 |
| 2,693,963 | 11/1954 | Moscato | 35—73 XR |
| 3,181,869 | 4/1965 | Genin et al. | 273—157 |

EUGENE R. CAPOZIO, *Primary Examiner.*

W. H. GRIEB, *Assistant Examiner.*

U.S. Cl. X.R.

35—71; 273—157